(12) United States Patent
Davis

(10) Patent No.: US 6,716,347 B1
(45) Date of Patent: Apr. 6, 2004

(54) WEAR RESISTANT INSERTS FOR FILTER PRESS PLATES

(75) Inventor: Steven S. Davis, Farmington, UT (US)

(73) Assignee: Envirotech Molded Products, Inc., Salt Lake City, UT (US)

( * ) Notice: Subject to any disclaimer, the term of this patent is extended or adjusted under 35 U.S.C. 154(b) by 58 days.

(21) Appl. No.: 10/052,159

(22) Filed: Jan. 16, 2002

Related U.S. Application Data

(60) Provisional application No. 60/261,734, filed on Jan. 16, 2001.

(51) Int. Cl.[7] .............................................. B01D 25/12
(52) U.S. Cl. ........................ 210/229; 210/230; 210/231
(58) Field of Search ................................ 210/224, 227, 210/229, 230, 231; 100/198; 285/16

(56) References Cited

U.S. PATENT DOCUMENTS

| | | | |
|---|---|---|---|
| 2,332,787 A | * | 10/1943 | Flemming .............. 137/533.13 |
| 4,608,164 A | | 8/1986 | Neu |
| 4,826,593 A | | 5/1989 | Nev |
| 4,911,839 A | | 3/1990 | Davis |
| 4,964,986 A | * | 10/1990 | Davis ......................... 210/231 |
| 4,997,560 A | | 3/1991 | Haberle |
| 5,100,548 A | | 3/1992 | Oelbermann |
| 5,484,526 A | * | 1/1996 | Bonn .......................... 210/229 |

FOREIGN PATENT DOCUMENTS

| | | | | |
|---|---|---|---|---|
| EP | 443469 A2 | * | 8/1991 | ........... B01D/25/21 |
| GB | 2165162 A | * | 4/1986 | ........... B01D/25/12 |
| JP | 60-168506 | * | 9/1985 | ........... B01D/25/12 |

* cited by examiner

Primary Examiner—Matthew O. Savage
(74) Attorney, Agent, or Firm—Morriss O'Bryant Compagni, P.C.

(57) ABSTRACT

A filter plate for a filter press assembly is disclosed which is structured with replaceable wear elements to increase the resistance of the filter plate to degradation caused by processing of abrasive filtrates. While the wear elements may eventually degrade due to contact with abrasive filtrates, the wear elements are easily replaceable, thereby prolonging the life of the filter plate and reducing operating costs. The replaceable wear elements may be used to retrofit existing filter plates.

6 Claims, 4 Drawing Sheets

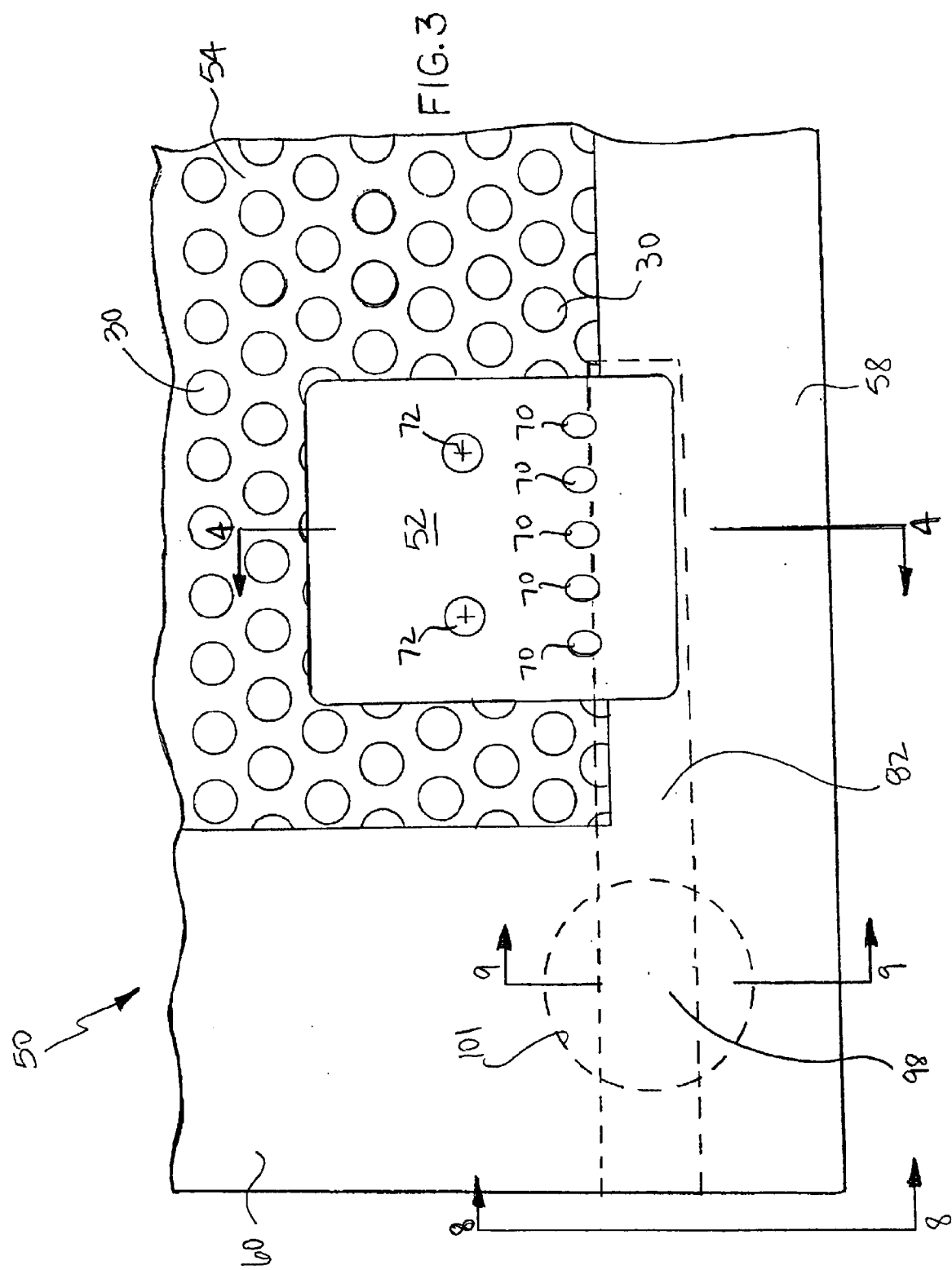

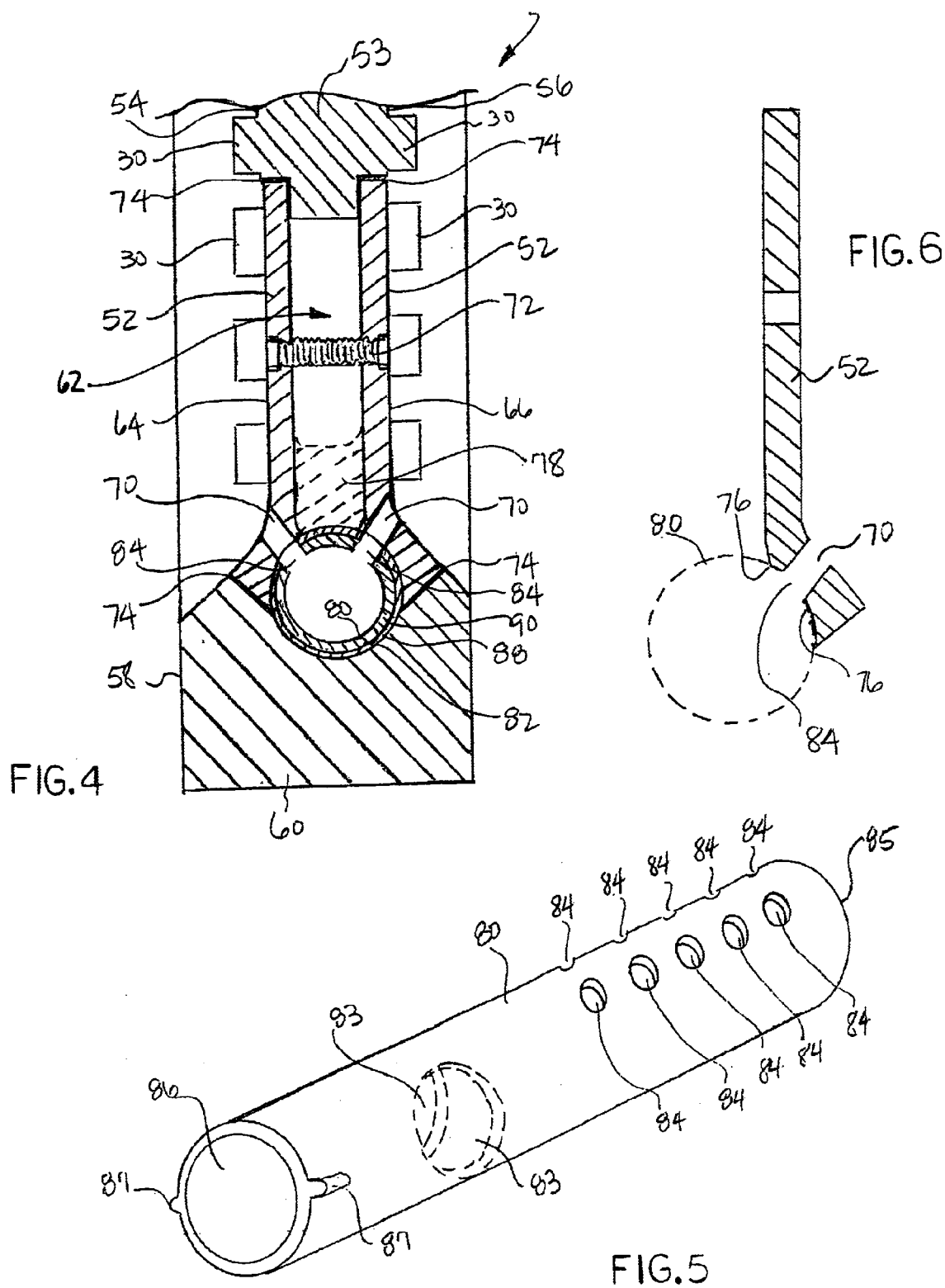

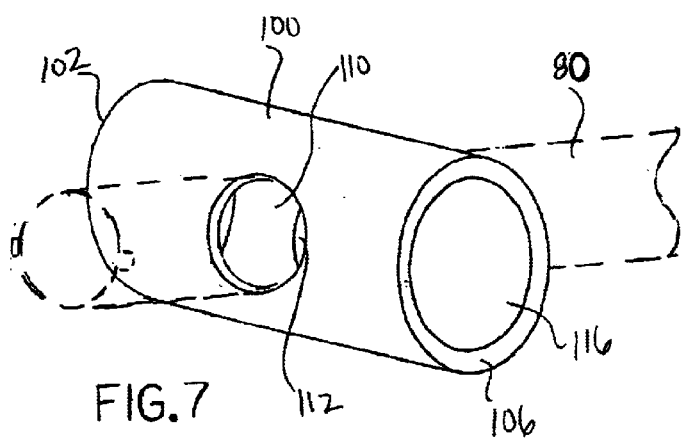
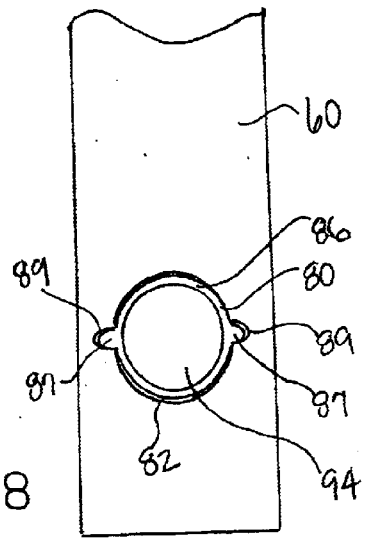
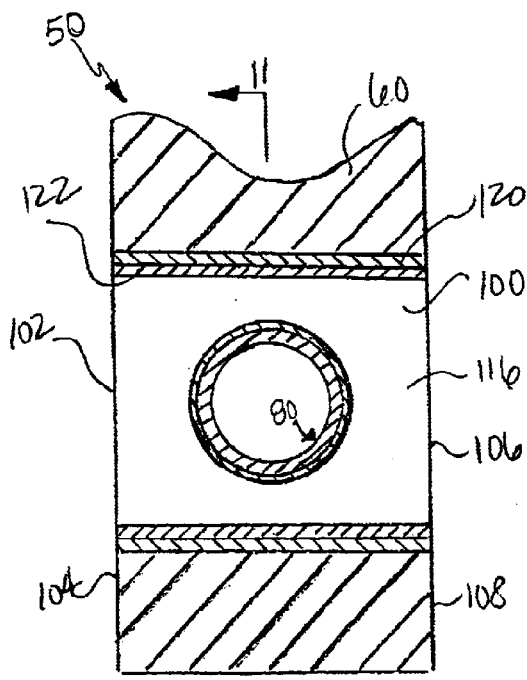
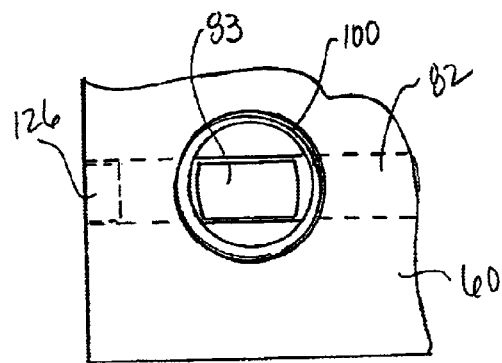
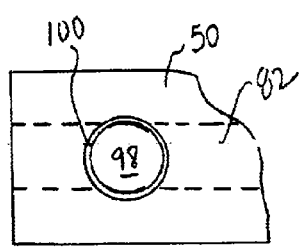
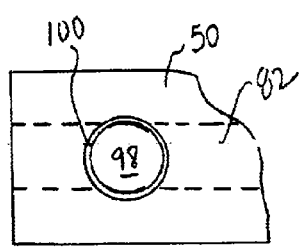

WEAR RESISTANT INSERTS FOR FILTER PRESS PLATES

CROSS-REFERENCE TO RELATED APPLICATIONS

This application claims priority to U.S. provisional patent application Serial No. 60/261,734 filed Jan. 16, 2001.

BACKGROUND OF THE INVENTION

1. Field of the Invention

This invention relates to filter press plates used in a filter press assembly, and more specifically relates to filter press plates configured with replaceable, wear resistant members associated with the filtrate ports of a filter plate which extend the life of the filter press plate.

2. Description of the Related Art

Filter press assemblies are used in many industries to process feed slurries resulting from a given process, such as mineral concentrate dewatering. Filter press assemblies involve separating a solids component from the liquid component of the feed slurry to produce a solid, dewatered cake of material. The remaining or separated liquid filtrate is channeled out of the filter press assembly for re-processing or disposal.

A filter press assembly comprises a plurality of planar filter plates which are aligned and adjacently arranged in a horizontal stack. Each filter plate has a peripheral edge or frame and one or more faces recessed from the rim or frame so that when two filter plates are positioned adjacent one another, a space is formed therebetween. Each filter plate also has a feed port which, when the filter plates are aligned and in adjacent arrangement, provides a feed channel into which a feed slurry is introduced.

The feed slurry enters the space formed between adjacent filter plates and the larger solids of the slurry are deposited while the liquid component drains away from the space and is channeled away from the filter press assembly. Typically, each face of a filter plate is covered with an arrangement of raised bosses or pips which form channels therebetween through which the liquid filtrate is communicated toward openings formed near the periphery of the filter plate. The openings are in fluid communication with a filtrate outlet through which the filtrate then empties.

In operation, each filter plate is typically covered with a filter media, usually made of cloth, and the feed slurry is introduced between adjacent layers of filter media. High velocity air is introduced between adjacent filter plates to air sweep the solids accumulating between the two layers of filter media and to force the filtrate through the filter media. A substantially dry and solid cake of solids material results. The liquid filtrate, being subjected to high velocity air, passes through the filter media and is channeled along the face of the filter plate at high velocity. The filtrate then enters into the openings and through the filtrate outlet at high velocity.

When processing feed slurries which have abrasive components that are small enough to pass through the filter media, or through holes worn in the filter media, the high-velocity filtrate moving along the faces of the filter plate and into the filtrate openings cause a significant amount of damage to the filter plate. Not only do the openings become worn and degraded, but the filtrate outlet becomes abraded and worn. Eventually the filtrate openings and filtrate outlets of the filter plate become so worn that leakage occurs between adjacent filter plates and the filter press assembly is unable to operate efficiently, or at all. The worn filter plates cannot be repaired and must be discarded and replaced with new filter plates. Replacing the filter plates is very expensive.

Thus, it would be advantageous in the art to structure a filter press plate to have increased resistance to degradation caused by the movement of high velocity abrasive filtrate and which would enable fast, easy and inexpensive repair of the filter plate when degradation does occur so that the life of the filter plate can be extended, thereby reducing operating costs.

BRIEF SUMMARY OF THE INVENTION

In accordance with the present invention, a filter press plate is structured with replaceable wear elements which provide wear resistance to the filtrate openings and filtrate outlet of the filter plate, thereby extending the life of the filter plate and facilitating easy and inexpensive repair of the filter plate when degradation of the wear element occurs.

In a filter plate of the present invention, the filter plate is structured to receive inserted replaceable wear elements in concert with the filtrate opening or outlet of the filter plate. The wear elements are preferably formed of a material which is particularly resistant to wear or degradation that may be caused by contact with high-velocity abrasive material. The wear elements are positioned on the filter plate to receive abrasive filtrate in transit to and through the filtrate outlet of the filter plate. Thus, the wear elements are subjected to the degrading effects of the abrasive filtrate, in the area of the filter plate where the most significant amount of degradation occurs, and the replaceability of the wear elements enables the filter plate to essentially be refurbished for further use, thereby extending the conventional life of the filter plate.

The wear elements of the present invention comprise one or more wear plates configured to fit over a portion of the recessed face of a filter plate, a filtrate channel insert and a filtrate outlet insert. The wear plates, filtrate channel insert and filtrate outlet insert are each constructed of a suitable wear-resistant material to withstand contact with abrasive material, but each is also readily replaceable when degraded.

A filter plate is described being structured with wear elements in accordance with the present invention. However, the wear elements of the present invention are also adaptable for retrofitting to virtually any type, style or manufacture of filter press plate.

BRIEF DESCRIPTION OF THE SEVERAL VIEWS OF THE DRAWINGS

In the drawings, which illustrate what is currently considered to be the best mode for carrying out the present invention:

FIG. 3 is a partial view of a corner of a filter press plate of the present invention, certain elements being shown in phantom;

FIG. 4 is a view in cross section of the filter press plate shown in FIG. 3, taken at line 4—4;

FIG. 5 is a perspective view of a filtrate channel insert of the present invention;

FIG. 6 is a view in cross section of a wear plate of the present invention;

FIG. 7 is a perspective view of a filtrate outlet insert of the present invention;

FIG. 8 is a view in elevation of the filter press plate shown in FIG. 3, taken at line 8—8;

FIG. 9 is a view in cross section of the filter press plate shown in FIG. 3, taken at line 9—9;

FIG. 10 is a view in elevation of the filter press plate shown in FIG. 3 showing the position and orientation of an internal filtrate outlet configuration of the present invention;

FIG. 11 is a view in cross section of the filter plate shown in FIG. 9, taken at line 11—11; and FIG. 12 is a view is cross section of a filter plate illustrating the relative dimensions of the wear elements.

DETAILED DESCRIPTION OF THE INVENTION

Figure 1:
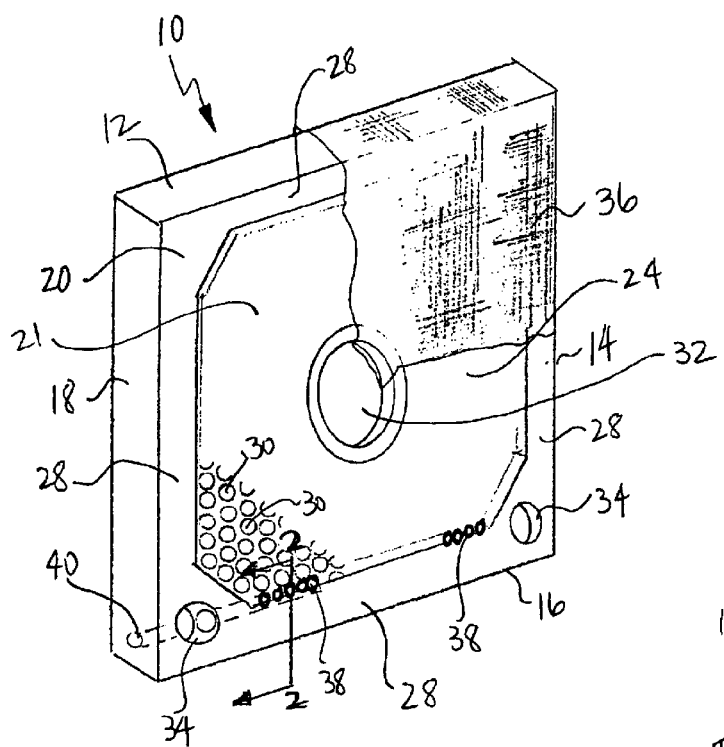
FIG. 1 is a perspective view of a filter press plate of the prior art, certain details being shown in phantom.
Figure 2:
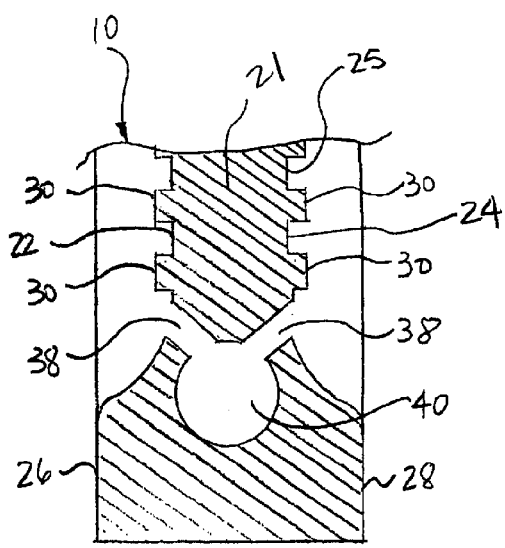
FIG. 2 is a partial view in cross section of the prior art filter press plate shown in FIG. 1, taken at line 2—2.

FIGS. 1 and 2 illustrate a typical filter plate 10 of the prior art. It can be seen that a filter plate 10 is generally planar, having four sides 12, 14, 16, 18 which form a frame 20 about the periphery of the body 21 of the filter plate 10 and two opposing recessed faces 22, 24 (only one being viewable from the perspective view of FIG. 1). The peripheral edge 26, 28 of the frame 20 surrounding each recessed face 22, 24, respectively, extends above the plane of each face 22, 24, as best seen in FIG. 2.

Each recessed face 22, 24 of the filter plate 10 may be configured with a plurality of raised bosses or pips 30 (only a representative few being shown) which extend above the surface level of the recessed faces 22, 24, thereby forming channels 25 between which filtrate is communicated. Notably, some filter plates, known as membrane plates, are fitted with an elastomer membrane which overlies the planar recessed face of the body 21 and is formed with raised pips that provide the same fluid channels.

The filter plate 10 is also constructed with a feed port 32 through which feed slurry is introduced and a passageway for egress of filtrate, typically comprising one or more filtrate outlets 34 through which filtrate is removed from the recessed faces 22, 24. Notably, the feed port 32 and filtrate outlets 34 may be located elsewhere about the filter plate 10 than is illustrated in FIGS. 1 and 2. The filter plate 10 is usually covered in its entirety with filter media 36, which is shown in FIG. 1 covering only one corner of the filter plate 10. The feed port 32 and filtrate outlets 34 are not covered.

Filtrate openings 38 are formed along the periphery of the recessed faces 22, 24 near the frame 20. The filtrate openings 38 are in fluid communication with a filtrate channel 40 (shown in phantom) formed in the filter plate 10. The filtrate channel 40 is in fluid communication with a filtrate outlet 34 (FIG. 1) when used. While not shown, it is understood that the filtrate outlets 34 of adjacently stacked filter plates form a continuous fluid pathway through which the filtrate moves to exit the filter press assembly. Alternatively, filtrate is removed from the filtrate channel 40 through a manifold to which is connected each filtrate channel 40 of each filter plate in the press.

In prior art filter plates, as shown in FIGS. 1 and 2, the filtrate channel 40 is formed during the molding of the filter plate 10 or is machined in the filter plate 10 after formation of the plate. The filtrate openings 38 are usually machined into the filter plate 10 after formation. When processing feed slurries which contain abrasive particulate matter small enough to pass through the filter media 36, or through holes worn in the filter media 36, the abrasive particulates and high-velocity filtrate passing through the filtrate openings 38 and filtrate channel 40 cause degradation of the filtrate openings 38, filtrate channel 40 and filtrate outlet 34. Once degraded, the filter plate will begin to leak and must be discarded and replaced in its entirety. This problem is solved by the present invention.

The present invention is illustrated in FIGS. 3–11 and comprises a system of wear elements positioned in a filter plate 50 to reduce degradation of the filter plate 50, particularly when processing abrasive filtrate. When the wear elements are eventually degraded, they can be easily and inexpensively replaced to extend the life of the filter plate 50.

The wear elements of the present invention comprise one or more replaceable wear plates 52 which are sized and configured to be positioned along the recessed face or faces 54, 56 (FIG. 4) of the filter plate 50 near the peripheral edge 58 of the frame 60 of the filter plate 50.

The filter plate 50 may be molded, or later machined, with an opening 62 through the body 53 of the filter plate 50, as shown in FIG. 4. The opening 62 is configured and sized to receive the wear plates 52 therein so that the outer surface 64, 66 of each wear plate 52 is aligned with the respective planar surface of the recessed face 54, 56 to which it is attached, thereby facilitating the flow of filtrate between the raised pips 30 and along the outer surface 64, 66 of the wear plates 52.

Each wear plate 52 may be formed with filtrate openings 70 into which the filtrate drains from the outer surface 64, 66, respectively, of each wear plate 52. Notably, it may be desirable in some applications to provide one recessed face 54 or 56 with a wear plate 52 having filtrate openings 70 while providing the opposing recessed face with a wear plate having no filtrate openings to selectively direct or determine flow rates.

As shown in FIG. 4, two wear plates 52, each positioned along an opposing recessed face 54, 56 of the filter plate 50, are aligned on either side of the body 53 of the filter plate 50 so that the two wear plates 52 may be secured together by, for example, a bolt 72 which extends through both wear plates 52 to hold them together. A gasket 74 may be positioned between the wear plates 52 and the opening 62 to provide a fluid-tight seal.

The wear elements of the present invention also include a replaceable wear-resistant filtrate channel insert 80 which is sized to be received in the pre-formed filtrate channel 82 (shown in phantom in FIG. 3) of the filter plate 50. As shown in FIGS. 3 and 4, the pre-formed filtrate channel 82 includes a portion with a cylindrical closed cross section located between the filtrate outlet 98 and the recessed faces 55. The pre-formed filtrate channel 82 may be formed in the filter plate 50 at the time the filter plate 50 is molded by, for example, positioning a rod into the mold, which is later removed. Alternatively, the channel 82 may be machined into the filter plate 50 by known methods.

The filtrate channel insert 80, further illustrated in FIG. 5, is made of wear-resistant material and is formed with apertures 84 which, when the filtrate channel insert 80 is positioned within the pre-formed filtrate channel 82, align with the filtrate openings 70 of the wear plates 52, as shown in FIG. 4.

As more clearly shown in FIG. 6, each wear plate 52 is particularly configured and molded to assure that a tight fit is provided between the filtrate openings 70 of the wear plates and the apertures 84 of the filtrate channel insert 80 so that filtrate does not leak between the wear plate 52 and the filtrate channel insert 80 in the area 76 between and surrounding the filtrate openings 70 and apertures 84. While separable, paired wear plates 52 provide a simplified means of providing wear elements in accordance with the present invention, it is also within the scope of the invention to provide a wear plate of singular or unitary construction, as suggested in phantom in FIG. 4 where, for example, a bridge portion 78 extends between opposingly-oriented sets of filtrate openings 70 and partially encircles the filtrate channel insert 80. Other configurations of the wear elements are also suitable for the invention.

As shown in FIG. 5, the filtrate channel insert 80 has a first closed end 85, which is positioned within the filter plate 50, and a second end 86 which may be open or closed, as described further hereinafter. Aligned side openings 83 (shown in phantom in FIG. 5) may be formed through the wall of the filtrate channel insert 80 for reasons that are described further hereinafter.

The filtrate channel insert 80 may be formed as a single ply or layer of wear-resistant material as suggested in FIG. 5; or, as illustrated in FIG. 4, may be formed as a two-ply or dual layer configuration having an outer layer 88 of relatively less wear-resistant material and an inner layer 90 of relatively more wear-resistant material. By way of example only, the outer layer 88 may be made of thin stainless steel and the inner layer 90 may be formed from high-abrasion grade rubber or urethane, such as urethane having a durometer of about 60D. Innumerable other materials are suitable, however, and may be employed in the manufacture of the filtrate channel insert 80.

The filtrate channel insert 80 may be held in the filtrate channel 82 by friction fit. Alternatively, the filtrate channel insert 80 may be configured in such a way as to provide stabilizing contact with the filter plate 50 to keep the filtrate channel insert 80 securely in place within the filtrate channel 82 (i.e., to maintain the alignment of the apertures 84 with the filtrate openings 70 of the wear plates 52).

By way of example, FIG. 5 illustrates that the second end 86 of the filtrate channel insert 80 may be configured with one or more splines 87 that, when the filtrate channel insert 80 is inserted in the pre-formed filtrate channel 82, register with notches 89 machined into the frame 60, as shown in FIG. 8. By further way of example, removable anchor pins or screws could be inserted through the frame to engage the filtrate channel insert 80 therewith. Further by way of example, the second end 86 of the filtrate channel insert 80 could be configured with a hexagonal, ovate or other geometrically-configured outer surface to securely engage a similarly-shaped machined opening in the frame 60 of the filter plate 50.

As shown in FIG. 8, the second end 86 of the wear-resistant filtrate channel insert 80 may be open to provide an end outlet 94 which serves as the filtrate outlet in what may be termed an external orientation. In other words, the filtrate is caused to exit from the filter plate 50 in a direction normal to the direction of slurry flow through the feed port 32 (FIG. 1). When multiple numbers of filter plates are in a filter press, the end outlet 94 of each filter plate 50 is connected to a manifold to carry the filtrate away from the filter press.

Alternatively, as suggested in phantom in FIG. 3, an internally-oriented filtrate outlet 98 may be employed as the means for providing egress for the filtrate. As noted previously, when an internally-oriented filtrate outlet 98 is employed, the aligned filtrate outlets of adjacently stacked filter plates form a continuous fluid pathway through the filter press for egress of filtrate in a direction parallel to the flow of slurry through the feed ports 32 (FIG. 1).

As shown more specifically in FIGS. 7 and 9–11, the wear elements of the present invention may further include a replaceable internal filtrate outlet insert 100 which is configured and positioned to intersect with the filtrate channel insert 80 to provide a fluid pathway therewith. The filtrate outlet insert 100, as shown separately in FIG. 7, may generally be cylindrical in lateral cross section (although other shapes or dimensions are also suitable) and is positionable within a pre-formed filtrate outlet channel 101 (FIG. 3) formed in the filter plate 50. The filtrate outlet channel 101 is formed in the filter plate 50 to intersect with the filtrate channel 82 at right angles thereto.

As best seen in FIGS. 7, 9 and 10, the filtrate outlet insert 100 is formed with a first open end 102, which is oriented to open on one side 104 of the filter plate 50, and a second open end 106, which is oriented to open on the other side 108 of the filter plate 50. The filtrate outlet insert 100 is also, in the embodiment shown, formed with dual openings 110 and 112 through the wall thereof. The dual openings 110, 112 are aligned to receive therethrough the filtrate channel insert 80 (shown in phantom in FIGS. 7 and 10) so that the side openings 83 (FIG. 5) of the filtrate channel insert 80 open into the bore 116 of the filtrate outlet insert 100 to provide a continuous fluid pathway for the filtrate moving from the openings 70 of the wear plates 52, through the filtrate channel insert 80 and out through the filtrate outlet insert 100. The illustrated arrangement of the filtrate channel insert 80 and filtrate outlet insert 100 is by way of example only, and other arrangements or configurations are suitable.

Like the filtrate channel insert 80, the filtrate outlet insert 100 is made of wear-resistant material and may be either a single ply construction, as suggested in FIG. 7, or a double ply construction, as shown in FIGS. 9 and 11. The filtrate outlet insert 100 may be a double layer construction of, for example, an outer layer 120 of NiHard and an inner layer 122 of polybutylene. Other wear-resistant materials are suitable for use.

The filtrate outlet insert 100 is held in place by friction fit and by virtue of its intersecting connection with the filtrate channel insert 80. As shown in FIG. 11 when a replaceable filtrate outlet insert 100 is employed in the filter plate 50 for internal filtrate drainage, the filtrate channel insert 80 is closed at the second end 86 thereof. The second end 86 may be stoppered or integrally formed with a plug 126, shown in phantom in FIG. 10. Preferably, however, the filtrate channel insert 80, as shown in FIG. 11, is formed at its second end 86 with portion having a solid core 128 which terminates flush with the wall 130 of the bore 116 of the filtrate outlet insert 100.

It is important to note that the relative size or dimension, and the arrangement, of the filtrate outlet insert 100 and the filtrate channel insert 80 shown in FIGS. 7, 10 and 11 is suitable and adequate for filter press assemblies of fewer filter plates, where pressure conditions through the aligned internally-oriented filtrate outlets 98 is less. However, as the number of filter plates in the filter press assembly increases, so do the pressure conditions in the aligned internally-oriented filtrate outlets 98 through which the filtrate flows. In such instances, it is more important that the size or dimension of the filtrate channel insert 80 be reduced relative to the filtrate outlet insert 100 so that the filtrate channel insert 80 does not present an obstruction of the filtrate outlet 98, thereby adversely affecting the pressure conditions in the aligned filtrate outlets 98. This arrangement is illustrated in FIG. 12.

The wear elements of the present invention provide a means for protecting and extending the life of a filter plate.

The wear plate, filtrate channel insert and filtrate outlet insert may be used singly or in any combination and may be adapted to any kind, manufacture or style of filter plate. Thus, those skilled in the art will understand that the wear elements of the invention may be adapted to suit any use and the illustrations herein are not meant to limit the scope of the invention.

What is claimed is:

1. A filter plate having improved wear-resistance, comprising:

a filter plate having opposing recessed faces providing a surface for movement of fluid therealong, a feed port and a filtrate channel extending through said filter plate to a position proximate said recessed faces for the egress of filtrate from said filter plate, said filtrate channel having a portion with a closed cross section; and replaceable wear elements positioned along said surface of at least one said recessed face of said filter plate and through said portion of said filtrate channel having a closed cross section to provide at least one filtrate opening and channel for directing filtrate flow from said filter plate.

2. The filter plate of claim 1 wherein said replaceable wear elements further comprise:

at least one replaceable wear plate positioned along said at least one said opposing recessed face;

at least one filtrate opening formed through said replaceable wear plate; and a replaceable filtrate channel insert disposed within said filtrate channel having at least one opening formed therethrough for alignment with said at least one filtrate opening to provide fluid communication between said at least one wear plate and said filtrate channel insert.

3. The filter plate of claim 2 further comprising a filtrate outlet intersecting said filtrate channel, and a replaceable filtrate outlet insert disposed within said filtrate outlet positioned to be in fluid communication with said filtrate channel insert to redirect the direction of flow of filtrate from said filter plate.

4. The filter plate of claim 2 wherein said filtrate channel insert comprises an inner layer of wear-resistant material and an outer layer of wear-resistant material, said material of said inner layer being more wear-resistant than said material of said outer layer.

5. The filter plate of claim 3 wherein said filtrate outlet insert comprises an inner layer of wear-resistant material and an outer layer of wear-resistant material, said material of said inner layer being more wear-resistant than said material of said outer layer.

6. The filter plate of claim 1 wherein said wear elements are made of material more wear-resistant than said filter plate.

* * * * *